United States Patent
Rikihisa et al.

(10) Patent No.: US 8,118,886 B2
(45) Date of Patent: Feb. 21, 2012

(54) FUEL MIXTURE, FUEL RELIQUEFYING SYSTEM, FUEL CARTRIDGE USING THE SAME, AND METHOD OF EXTRACTING FUEL; FOR FUEL CELLS

(75) Inventors: Hiroaki Rikihisa, Tokyo (JP); Yoshinori Matsunaga, Tokyo (JP); Tetsuya Hamaguchi, Tokyo (JP); Takeshi Ooi, Kanagawa (JP)

(73) Assignees: The Furukawa Electric Co., Ltd., Tokyo (JP); The University of Tokyo, Tokyo (JP)

( * ) Notice: Subject to any disclaimer, the term of this patent is extended or adjusted under 35 U.S.C. 154(b) by 1103 days.

(21) Appl. No.: 11/878,560

(22) Filed: Jul. 25, 2007

(65) Prior Publication Data
US 2008/0026267 A1    Jan. 31, 2008

Related U.S. Application Data

(63) Continuation of application No. PCT/JP2006/301256, filed on Jan. 20, 2006.

(30) Foreign Application Priority Data

Jan. 26, 2005  (JP) ................................ 2005-018092
Aug. 17, 2005  (JP) ................................ 2005-236990

(51) Int. Cl.
    *C10L 7/00*    (2006.01)
(52) U.S. Cl. ................ 44/265; 44/268; 44/270; 44/271; 44/272

(58) Field of Classification Search ............. 44/265, 44/268, 270, 271, 272
See application file for complete search history.

(56) References Cited

U.S. PATENT DOCUMENTS

| 2,610,952 A * | 9/1952 | Fischer et al. ................ 516/99 |
| 5,470,677 A * | 11/1995 | Williams et al. ............. 429/303 |
| 7,354,461 B2 * | 4/2008 | Nemeth et al. ................ 44/265 |
| 7,531,013 B2 * | 5/2009 | Ren et al. ........................ 44/266 |
| 2005/0034357 A1 * | 2/2005 | Nemeth et al. ................ 44/265 |
| 2005/0136247 A1 | 6/2005 | Sumiya et al. |

FOREIGN PATENT DOCUMENTS

| JP | 04-013828 A | 1/1992 |
| JP | 11-315753 A | 11/1999 |
| JP | 2001-93558 A | 4/2001 |
| JP | 2004-6335 A | 1/2004 |
| JP | 2004-127659 A | 4/2004 |
| JP | 2004-158304 A | 6/2004 |
| JP | 2004-206885 A | 7/2004 |

* cited by examiner

*Primary Examiner* — Cephia D Toomer
(74) *Attorney, Agent, or Firm* — Birch, Stewart, Kolasch & Birch, LLP (57) ABSTRACT

A fuel mixture for fuel cells, comprising a gelled product containing at least a fuel and a gelling agent, in which reliquefaction for the fuel of the gelled product is brought about in the coexistence with a reliquefying agent; and a method of extracting a fuel for fuel cells, including: providing a gel structure in which a fuel is incorporated into a network structure of a gelling agent, with a reliquefying agent dispersed therein; adding a reliquefaction inducing agent to the gel structure to make the reliquefying agent break the network structure of the gelling agent, and thereby reliquefying and extracting the fuel.

22 Claims, 2 Drawing Sheets

FUEL MIXTURE, FUEL RELIQUEFYING SYSTEM, FUEL CARTRIDGE USING THE SAME, AND METHOD OF EXTRACTING FUEL; FOR FUEL CELLS

This application is a Continuation of PCT International Application No. PCT/JP2006/301256 filed on Jan. 20, 2006, which designated the United States, and on which priority is claimed under 35 U.S.C. §120. This application also claims priority under 35 U.S.C. §119(a) on Patent Application No(s). 2005-018092 and 2005-236990 filed in Japan on Jan. 26, 2005 and Aug. 17, 2005; respectively. The entire contents of each of the above documents is hereby incorporated by reference.

TECHNICAL FIELD

The present invention relates to a fuel mixture for fuel cells. Also, the present invention relates to a fuel reliquefying system for fuel cells, to a fuel cartridge for fuel cells, and to a method of extracting fuel for a fuel cell.

BACKGROUND ART

Recently, fuel cells attract particular attention because electric energy can be directly obtained by an electrochemical reaction of a fuel, and it is advantageous that they have high generating efficiency with little emission of harmful materials, and facilitate the reduction of weight and size.

Meanwhile, hydrogen gas or methanol has been used as a fuel for fuel cells, and it is necessary to take care in handling these fuels. Hydrogen gas is one of flammable gases that can ignite upon reaction with oxygen in the air, if an ignition source having a certain temperature or more is present when the concentration of hydrogen in the air is 4% to 75%. Therefore, there is a possibility of ignition, if hydrogen gas is mixed with the air in a fuel cell as a result of, for example, generation of cracks in a separator plate or fracture in an electrolyte film; and thus extra safety and careful handling are required. Methanol is also a volatile and flammable material and it can have an adverse influence on the human body when inhaled in the human body. Moreover, it is known that methanol produces an oxidation reaction intermediate, such as formic acid or formaldehyde, which can also adversely affect the human body. Therefore, there has been a demand for a development of a fuel cell system provided with a fail-safe mechanism.

To cope with this demand, methods have been recently proposed which store a fuel in a form of a gel. However, although these disclosures use a fuel in a form of a gel, they do not contemplate efficiently extracting the fuel therefrom. That is, for example, some of the fuel cannot be extracted from the inside of the gel when generating electricity, bringing about considerable fuel loss and low generating efficiency in these methods.

Other and further features and advantages of the invention will appear more fully from the following description, taken in connection with the accompanying drawings.

DISCLOSURE OF INVENTION

The present invention provides the following means:

(1) A fuel mixture for fuel cells, comprising a gelled product containing at least a fuel and a gelling agent, in which reliquefaction for the fuel of the gelled product is brought about in the coexistence with a reliquefying agent.

(2) The fuel mixture for fuel cells according to the above (1), wherein the reliquefying agent is in a gel state.

(3) The fuel mixture for fuel cells according to the above (1) or (2), wherein the reliquefying agent has an average molecular weight of 100 or more.

(4) The fuel mixture for fuel cells according to any one of the above (1) to (3), wherein at least the fuel and the gelling agent are mixed to form the gelled product, and wherein the reliquefying agent acts on the gelled product to reliquefy the fuel.

(5) The fuel mixture for fuel cells according to the above (1), wherein the gelled product comprises at least the fuel and the gelling agent, with the reliquefying agent dispersed therein, and wherein a reliquefaction inducing agent acts on the gelled product to reliquefy the fuel.

(6) The fuel mixture for fuel cells according to the above (5), wherein the gelling agent incorporates the fuel into its network structure, with the reliquefying agent dispersed therein, so as to form a gel structure of the gelled product, and wherein the reliquefying agent breaks the network structure of the gelling agent by virtue of the reliquefaction inducing agent acting on the gel structure to reliquefy the fuel.

(7) The fuel mixture for fuel cells according to the above (5), wherein the gelling agent incorporates the fuel into its network structure forming a gel structure of the gelled product, with the reliquefying agent made of an electrolyte dispersed in a substantially unionized state, and wherein the electrolyte ionized by virtue of the reliquefaction inducing agent acting on the gel structure breaks the network structure of the gelling agent to reliquefy the fuel.

(8) The fuel mixture for fuel cells according to any one of the above (5) to (7), wherein the reliquefying agent is a high-molecular electrolyte, ascorbic acid, stearic acid, peptide, sodium bicarbonate, a solid or liquid organic acid, or a solid or liquid organic acid salt.

(9) The fuel mixture for fuel cells according to the above (8), wherein the reliquefying agent is formed in a fine particle shape using inorganic metal particulates or high-molecular beads.

(10) The fuel mixture for fuel cells according to any one of the above (5) to (9), wherein the gelling agent is a compound selected from the group consisting of polyacrylic acid, polyacrylamide, polyethylene glycol, crosslinking type polyacrylic acid, and crosslinking type polyacrylamide, or a compound derived from these compounds.

(11) The fuel mixture for fuel cells according to any one of the above (5) to (10), wherein the fuel comprises methanol, ethanol, dimethyl ether, formic acid, formalin, hydrazine, or sodium borohydride.

(12) The fuel mixture for fuel cells according to any one of the above (5) to (11), wherein the reliquefying agent is a high-molecular electrolyte having a nonionic group or a cationic group or both on a side chain.

(13) The fuel mixture for fuel cells according to any one of the above (5) to (12), wherein the reliquefaction agent is an electrolyte salt containing a metal ion group.

(14) The fuel mixture for fuel cells according to any one of the above (5) to (13), wherein the reliquefaction inducing agent is selected from water, an amino acid solution, a peptide solution, a sulfuric acid solution, and an organic acid solution.

(15) The fuel mixture for fuel cells according to any one of the above (6) to (14), wherein the gel structure is an electrolyte gel.

(16) The fuel mixture for fuel cells according to any one of the above (6) to (15), wherein the gel structure is crosslinked.

(17) The fuel mixture for fuel cells according to any one of the above (6) to (16), wherein the gel structure has a nesting structure or a double network structure of a plurality of said gelling agents.

(18) The fuel mixture for fuel cells according to any one of the above (6) to (17), wherein the gelling agent is dispersed and preserved in the gel structure by molecular imprint.

(19) The fuel mixture for fuel cells according to any one of the above (1) to (18), further comprising an identification agent or a combustion improver having a high vapor pressure.

(20) The fuel mixture for fuel cells according to any one of the above (1) to (19), further comprising a surfactant.

(21) The fuel mixture for fuel cells according to any one of the above (1) to (20), further comprising an antifreezing agent.

(22) A fuel reliquefying system for fuel cells, comprising: at least a fuel, a gelling agent, a reliquefying agent, and a reliquefaction inducing agent, in which the fuel is reliquefied by adding the reliquefaction inducing agent to the gelled fuel mixture according to any one of the above (5) to (21).

(23) The fuel reliquefying system for fuel cells according to the above (22), further comprising a porous material which expands a reaction area between the reliquefaction inducing agent and the reliquefying agent.

(24) A fuel cartridge for fuel cells, which uses the fuel mixture according to any one of the above (1) to (21) or the fuel reliquefying system according to the above (22) or (23).

(25) A method of extracting a fuel for fuel cells, comprising:
forming a gel structure in which a fuel is incorporated into a network structure of a gelling agent, with a reliquefying agent dispersed therein,
adding a reliquefaction inducing agent to the gel structure to make the reliquefying agent break the network structure of the gelling agent, and thereby
reliquefying and extracting the fuel.

(26) The method of extracting a fuel for fuel cells according to the above (25), wherein the gel structure is formed in which the fuel is incorporated into the network structure of the gelling agent, with the reliquefying agent made of an electrolyte dispersed in a substantially unionized state, and wherein the reliquefaction inducing agent is added to ionize the electrolyte and to make the ionized electrolyte break the network structure of the gelling agent, and thereby the fuel is reliquefied and extracted.

The present invention can provide a fuel mixture for fuel cells and a fuel reliquefying system for fuel cells, which have high safety, are excellent in handling, and have high generating efficiency; and the present invention can provide a fuel cartridge for fuel cells and a method of extracting fuel for a fuel cell each of which uses the fuel mixture or the system.

The fuel mixture of the present invention has high safety and also has excellent generating efficiency. The fuel mixture may be therefore preferably used as a fuel for fuel cells used in, for example, portable power sources, power sources for vehicles, and domestic power source systems. Further, the fuel of the present invention may be made into a fuel reliquefying system for fuel cells which can allow prescribed control of the solid-liquid transformation of the fuel, is improved in liquid leakage and thus improved in handling, and can attain high electromotive force with a small amount of fuel. Also, the fuel of the present invention enables fuel cell structures to be simplified, small-sized, and light-weighted, and allows diversifying the structures into certain forms such as a fuel cartridge.

BEST MODE FOR CARRYING OUT THE INVENTION

The inventors of the present invention have made earnest studies and as a result, found that, by fluidizing and extracting a gelled and stored fuel by an action of a reliquefying agent, it is possible to prepare a fuel mixture having not only high safety but also high generating efficiency. The present invention will be explained in detail.

Examples of the fuel for use in the fuel mixture for fuel cells according to the present invention include organic type liquid fuels such as methanol, ethanol, isopropanol, 1-propanol, dimethyl ether, formic acid, formalin, and hydrazine; and gas fuels, which is in a gas state when generating electricity, such as hydrogen, ammonia, natural gas, naphtha, coal gas, and biomass gas. Besides the above compounds, sodium borohydride and the like may also be used. Among these compounds, methanol and hydrogen gas are preferable because of high generating efficiency, and methanol is particularly preferable because it enables downsizing and light-weighting.

In the fuel mixture for fuel cells according to the present invention, a liquid fuel may be used as it is while the aforementioned gas fuels, such as hydrogen, may be used by fluidizing it. Fluidization of gas fuel is preferably carried out in the following manner: for example, an occlusion material is made to occlude a gas fuel in advance and is then dispersed in a dispersion medium, to form a dispersed fluid fuel. Examples of the occluding material of gas fuel include hydrogen occlusion alloys, hydrogen-absorbing agents such as carbon nanotube, chemical hydrides (organic hydrides, borohydrides, and sodium hydrides), and metal complexes. Also, examples of the dispersion medium that disperses the hydrogen occlusion material that has occluded gas fuel include water and organic solvents, such as methanol, ethanol, dimethyl ether, formic acid, formalin, and hydrazine.

In the fuel mixture for fuel cells according to the present invention, the gelling agent is one which at least can be gelled together with the fuel, and the gelling agent may give a chemical gel in which the fuel is absorbed in an organic polymer or the like, or a physical gel which exhibits thixotropy due to the interaction between the fluid fuel and the gelling agent. The gelling agent is preferably one which forms a network structure either singly or in combination with the fuel or the like, by crosslinking, hydrogen bonding, entanglement of molecules, and the like, and incorporates the fuel into the network structure, to form a gel structure. Examples of the method of preparing the gel structure include the followings: (1) a method of adding a gelling agent to the aforementioned fuel, to swell the gelling agent, thereby to obtain a gel structure, (2) a method of dissolving a monomer and a reaction initiator, in the aforementioned fuel, and then polymerizing the monomer, to obtain a gel structure, and (3) a method of dissolving a monomer, a reaction initiator, and a crosslinking agent, in the aforementioned fuel, and then polymerizing the monomer, to crosslink, thereby to obtain a gel structure.

In addition, uniform organic-inorganic hybrid gels (see, for example, Emiko Oda, Naofumi Ei, Akinori Toyoda, and Hidemitsu Furukawa: The Society of Polymer Science, Japan, Preprint, 53(2), 3263 (2004)), and a topological gel in which the network works as a pulley (see, for example, Y. Okumura, K. Ito: Adv. Mater., 13, 485 (2001)) may be given as examples of the gel structure having a gelling-agent-network structure.

As the gelling agent for use in the fuel mixture for fuel cells according to the present invention, for example, an electrolyte gelling agent that can constitute an electrolyte gel can be mentioned. When the gelling agent is a high-molecular compound, it may be either a crosslinking type high-molecular gelling agent or a non-crosslinking type high-molecular gelling agent. When a crosslinking type high-molecular gelling agent is used, the amount of the fuel to be absorbed may be controlled by adjusting the balance between an absorbing power acting so as to incorporate a fuel (for example, affinity to a material used as the fuel, osmotic pressure) and a power acting so as to prevent the absorbing action (for example, elastic power based on a network structure).

Examples of the non-crosslinking type high-molecular gelling agent include high-molecular compounds having an acidic and/or basic polar group. As these high-molecular compounds, polyacrylic acid, polyacrylamide, and polyethylene glycol, or derivatives of these compounds are preferable; polyacrylic acid and its derivatives are more preferable, and polyacrylic acid is particularly preferable.

Examples of the crosslinking type high-molecular gelling agent include those obtained by crosslinking the above non-crosslinking high-molecular gelling agents or derivatives thereof (for example, crosslinking type polyacrylic acid or its derivatives and crosslinking type polyacrylamide); networked products obtained by a crosslinking agent, networked products obtained by introducing a crosslinking monomer, networked products obtained by self-crosslinking, networked products obtained by irradiation with light or radial rays, insolubilized (crosslinked) products obtained by copolymerization of hydrophobic monomers, insolubilized (crosslinked) products obtained by introducing a crystalline polymer block, crosslinked products obtained by polyvalent metal cations, and crosslinked products obtained by introducing secondary bonds such as a hydrogen bond.

Besides the above compounds, high water-absorbing polymers are preferably used. Examples of these polymers include starch type polymers (for example, starch/acrylonitrile graft polymer hydrolysates, starch/acrylic acid graft polymers, starch/styrenesulfonic acid graft polymers, starch/vinylsulfonic acid graft polymers, and starch/acrylamide graft polymers), cellulose type polymers (for example, cellulose/acrylonitrile graft polymers, cellulose/styrenesulfonic acid graft polymers, and crosslinked products of carboxymethyl cellulose), polysaccharide type polymers (for example, hyaluronic acid and agarose), proteins (for example, collagen and gelatin), polyvinyl alcohol type polymers (for example, polyvinyl alcohol crosslinked polymers and PVA water-absorbing gel frozen thawed elastomers), acryl type polymers (for example, sodium polyacrylate crosslinked products, saponified products of sodium acrylate/vinyl alcohol copolymers, saponified products of methyl acrylate/vinyl acetate copolymers, saponified products of polyacrylonitrile type polymers, and hydroxyethylmethacrylate polymers (HEMA)), addition polymers (for example, maleic acid anhydride(co)polymers, and vinylpyrrolidone type (co)polymers), polyether type polymers (for example, polyethylene glycol diacrylate crosslinked polymers), and condensed types polymers (for example, ester type polymers and amide type polymers).

There is no particular limitation to the shape or form of the gelling agent, and the gelling agent may have an undefined shape (for example, liquid form or arabic-glue form), or a pulverized form, a powder form, a particle form, a particulate form, a pearl form, a beads form, a flake from, a small block form, a bulk form, a block from, a fiber form, a film form, a sheet form, a nonwoven fabric form, a laminate, a molded article, a foamed body, a porous body, or the like.

Some of the aforementioned gelling agents are also mentioned in, for example, Eizo Ohmori, "Kinosei Acryl-jushi (Functional Acryl resin)", published by Technosystem; Yoshihito Nagata (edition), "Gel Handbook", published by NTS Inc.; and Ryo Yoshida, "Kobunshi-gel (Kobunshi Sentan Zairyo, one point) (Polymer Gel (High-technologies of Polymer Material, one point))", published by The Society of Polymer Science, and reference may be made to these for the details of the agents.

Further, if the gelling agent is one discriminated into a physical-gelling-system gelling agent, examples of such the gelling agent include materials that form a gel together with the fuel or the like by a weak bond such as hydrogen bonding. Examples of such the gelling agent other than some of the aforementioned gelling agents include activated carbon, inorganic oxides such as amorphous colloidal silicone dioxide, and derivatives of organic amides.

Also, it is preferable to use plural gelling agents so that the gel structure constructs a nesting structure or a double network structure when it is gelled. The nesting structure or the double network structure means an entangled structure of plural types of gels. As an example of the entangled structure, a structure in which a closely crosslinked, stiff, strong electrolyte gel (1st network) is entangled with a loosely crosslinked, rich-in-flexibility, neutral gel (2nd network) can be mentioned. Also, those described in, for example, Hidemitsu Furukawa, "Gel no Fukuzatu-kozo—Amime no Fukuzatu-sei to Rikigaku-bussei—(Complex Structure of Gel, —Complexity and Dynamic Properties of Network—)", Polymer, vol. 54, pp. 458-461, July, 2005, may be preferably used. Other thickeners and polymer absorbing agents may also be used.

Though there is no particular limitation to the molecular weight of the gelling agent, the molecular weight of the gelling agent is preferably 100 or more and more preferably 1,000 to 8,000,000 (in the present invention, the term "molecular weight" means a weight average molecular weight unless otherwise noted). However, a gelling agent having a higher molecular weight which is crosslinked using a crosslinking agent or the like may also be used.

If the average molecular weight of the gelling agent is too small, it is difficult to separate the gelling agent from low-molecular compounds such as fuel when extracting only the fuel after the reliquefaction, decreasing availability of an inexpensive filter. If the molecular weight is too large, there can be a case where a reliquefying agent scarcely penetrates into a gelled product constituted of gelling agent.

Liquid fuel is decreased in the rate of vaporization and increased in viscosity, by the interaction with the gelling agent. Though there is no particular limitation to the amount of the gelling agent to be added, it is preferable to properly adjust the amount according to the type of gelling agent such that the viscosity of the gelled fuel (in the present invention, the term "viscosity" means a viscosity measured at room temperature (25° C.) unless otherwise specified) would be 0.02 Pa·sec or more. In the case of using a polyacrylic acid or a crosslinked product of polyacrylic acid as the gelling agent, the amount of the gelling agent is preferably 3 to 30 parts by mass and more preferably 3 to 10 parts by mass, based on 100 parts by mass of the fuel. The amount of the gelling agent is preferably small so as not to decrease the content of the fuel; but if the amount of the gelling agent is too small, it is difficult to ensure the reactivity of gelation and reliquefaction. If the viscosity of the gelled fuel is 0.02 Pa·sec or more, it is possible to ensure safety because scattering of the fluid at the time when the tank is broken or the fuel is carried can be reduced.

As a method of refluidizing fuel, there are a method of refluidizing fuel by irradiating the fuel with heat or ultraviolet light, or by applying external stimulation, or by adding no solution, and a method of refluidizing fuel using a reliquefying agent. However, in the case of the fuel mixture for fuel cells according to the present invention, refluidization is carried out by (I) adding a reliquefying agent or (II) by dispersing a reliquefying agent in advance and then adding a reliquefaction inducing agent. It is not preferable to employ the method of refluidizing fuel by irradiating heat or ultraviolet light, or by applying external stimulation, or by adding a solution. This is because the environment where fuel cells are utilized ranges widely, and thus, when, for example, the tank is broken, there is a possibility that unintended heat, ultraviolet light, or external stimulation is applied to the gelled fuel. In the case of using a reliquefying agent or a reliquefaction inducing agent, it is possible to prevent the unprepared reliquefaction. However, the liquefying method by addition of a reliquefying agent or a reliquefaction inducing agent may be combined with the liquefying method by application of other external stimulation, insofar as the effect of the present invention is not impaired.

(I) As a preferred embodiment of the present invention, a reliquefying agent addition type fuel reliquefying system in which a reliquefying agent is added to a gelled and preserved fuel, to reliquefy the fuel, will be explained in detail.

In the fuel mixture for fuel cells according to the present invention, examples of the reliquefying agent to be used in this embodiment include, though not particularly limited to, a material that forms hydrogen bonding with a part of the gelled fuel and a material that forms ionic bonding with a part of the gelled fuel mixture. Specific examples are high-molecular electrolytes (preferably ionic high-molecular compounds containing a nonionic group, a cationic group, or both, on a side chain; specific examples of these compounds include polyethylene imine, high-molecular coagulants (for example, various amphoteric, cationic or anionic high-molecular coagulants), ion-exchange resins (for example, strong acid type or weak acid type cation exchange resins and strong base type (I-type or II-type) or weak base type anion exchange resins)), proteins, peptides, collagens, gelatins, and agars. In the present invention, the reliquefying agent is not the same material as the gelling agent.

The reliquefying agent is an agent that interacts with a gelled product constituted of at least the fuel and the gelling agent, to cause the reliquefaction of the fuel and is preferably one that removes restrictions on the fuel in the gelled product, by the production of an insoluble salt, a variation in pH, and the entanglement of molecules, each of which will be explained later, or by the action of a combination of them, based on the affinity (for example, hydrogen bonding force, ionic bonding force, and Van der Waals force) to the gelling agent in the gelled product, to reliquefy the fuel.

The reliquefying agent is defined based on the relation between a polar group contained in the reliquefying agent and a polar group contained in the gelling agent. Even if the polarity of the reliquefying agent (the polarity of the side chain in the case of a high-molecular compound) and the polarity of the gelling agent (the polarity of the side chain in the case of a high-molecular compound) are opposite to each other or one of both has an amphoteric polarity, they may be used as those causing reliquefaction. The polarity of the reliquefying agent is preferably the inverse of the polarity of the gelling agent and it is more preferable that these polar groups have high reactivity. When, for example, an acidic material, for example, a polyacrylic acid, is used as the gelling agent, it is preferable to use an alkaline material of the inverse polarity, for example, a polyethylene imine, as the reliquefying agent.

The average molecular weight of the reliquefying agent is preferably 100 or more and more preferably 1,000 to 8,000,000. It is however possible to use a reliquefying agent which is crosslinked using a crosslinking agent or the like, to have a larger molecular weight.

If the average molecular weight of the reliquefying agent is too small, it is difficult to separate the reliquefying agent from low-molecular compounds such as fuel when extracting only the fuel after the reliquefaction, decreasing availability of an inexpensive filter. If the molecular weight is too large, there can be a case where a reliquefying agent scarcely penetrates into a gelled product constituted of gelling agent.

Moreover, the reliquefying agent is preferably in a gel state. When the reliquefying agent is in a gel state, it is easier to separately preserve the gelled fuel and the reliquefying agent than in the case where the reliquefying agent is liquid. Also, it is easier to mix the gelled fuel with the reliquefying agent than in the case where the reliquefying agent is granules. Specifically, for example, this makes it possible to separately preserve the gelled fuel and the reliquefying agent in a gel state with using a dividing wall with many small holes, and mix them by applying pressure to the reliquefying agent in a gel state.

In the fuel mixture for fuel cells according to the present invention, when carrying out (I) the reliquefaction by adding a reliquefying agent, if the reliquefying agent is in a gel state, it is possible to properly prevent the reliquefying agent from being carried away from clearances of the outermost wall of a fluid fuel cartridge or cracks generated, for example, by dropping the fluid fuel cartridge.

The reliquefying agent in a gel state preferably has a viscosity enough to prevent itself from passing through the small holes of the aforementioned dividing wall dividing the gelled fuel from the reliquefying agent in a gel state and more preferably has a viscosity of 0.01 Pa·sec or more.

In the fuel mixture for fuel cells according to the present invention, when carrying out (I) the reliquefaction by adding a reliquefying agent, the amount of the reliquefying agent to be added (in the case of using plural reliquefying agents, the total amount) is preferably set to an amount sufficient to reliquefy the gelled product, though no particular limitation is imposed on it. For this, the amount of the reliquefying agent may be determined in relation to the amount of the fuel and the amount of the gelling agent which interacts thereon and is preferably 1 to 30 parts by mass and more preferably 1 to 10 parts by mass, based on 100 parts by mass of the fuel. The amount of the reliquefying agent to be added is preferably small so as not to lower the content of the fuel; however, if the amount of the reliquefying agent is too small, it is difficult to ensure the reactivity of the reliquefaction. It is therefore preferable to determine the amount of the reliquefying agent in consideration of the content of the fuel and the reliquefaction reactivity.

(II) Next, as another preferred embodiment of the present invention, a reliquefaction inducing agent addition type fuel reliquefying system in which a reliquefaction inducing agent is added to a gelled and preserved fuel, to reliquefy the fuel, will be explained.

In the fuel mixture for fuel cells according to the present invention in this embodiment, the reliquefying agent is dispersed in advance in a mixture constituted of at least the gelling agent and the fuel. The reliquefying agent is preferably one which can be dispersed in a substantially insoluble state in the mixture or one which can be dispersed in a slightly dissolved state. Moreover, the reliquefying agent is preferably an agent which has the following properties: when the reliquefaction inducing agent is added, the reliquefaction inducing agent acts on the reliquefying agent, that is, for example, the reliquefaction inducing agent raise the solubility of the reliquefying agent in the gelled mixture; this causes the action based on the affinity between the gelling agent and the reliquefying agent as mentioned in the embodiment (I); and the reliquefying agent breaks the network structure of the gel structure, thereby enabling extraction of the fuel from the network structure of the gel structure.

Also, the reliquefying agent is preferably made of an electrolyte, and the electrolyte is preferably dispersed in a substantially unionized state (i.e. a less ionized state) in the gel structure prior to reliquefaction. Here, the description "the electrolyte prior to the reliquefaction is in a substantially unionized state" means that the electrolyte has a relatively lower degree of ionization than when it is liquefied. The reliquefying agent made of an electrolyte is preferably an agent having the following properties: when the reliquefaction inducing agent is added, the reliquefaction inducing agent acts on the reliquefying agent, that is, for example, the reliquefaction inducing agent raises the degree of ionization of the electrolyte in the gel mixture, to ionize the electrolyte; this causes the action based on the affinity between the gelling agent and the reliquefying agent as mentioned in the embodiment (I); and the reliquefying agent breaks the network structure of the gel structure, thereby enabling extraction of the fuel from the network structure of the gel structure.

When the reliquefying agent is made of an electrolyte, preferable examples of the reliquefying agent include high-molecular electrolytes (a preferable range is the same as that mentioned in the case (I) of reliquefaction by adding the reliquefying agent), ascorbic acids (for example, L-ascorbic acid (Vitamin C), D-ascorbic acid, isoascorbic acid, erythorbic acid, and oxidation-reduction derivatives of these acids (dehydroascorbic acid)), stearic acid, protein, peptide, collagen, gelatin, agar, and other solid or liquid organic acids. These electrolytes are preferably used as salts containing a metal ion group and the like. Moreover, sodium bicarbonate is also preferably used as the reliquefying agent.

The aforementioned preferable reliquefying agents may be used either singly or in combinations of two or more. When it is used singly, peptide, protein or an electrolyte containing a metal ion is preferable, whereas when a combination of two or more of them is used, for example, a combination of an ascorbic acid and a protein or a combination of an ascorbic acid and a peptide is preferable.

When the reliquefying agent is dispersed in advance in the fuel mixture prior to use in the fuel mixture for fuel cells according to the present invention, it is preferable to use the reliquefying agent having a powder form or fine particle form, though there is no particular limitation to the form of the reliquefying agent. For example, the reliquefying agent may be formed in a fine particle shape using inorganic metal particulates, polymer beads or the like. The particle diameter of fine particles is preferably 0.01 mm to 1 mm and more preferably 0.1 mm to 1 mm in terms of average particle diameter, though no particular limitation is imposed on it. As the particle diameter is increased, it is easier to separate the reliquefying agent from the fuel with a filter. However, when the particle diameter is too large, the reaction between the reliquefying agent and the gel is slow, causing difficulties in reliquefaction.

In the aforementioned reliquefaction by adding a reliquefying agent (I), a skin layer (film) can sometimes be formed at the boundary between the gelling agent and the reliquefying agent, depending on the combination of these. If the skin layer is formed, the subsequent reaction between the reliquefying agent and the gelling agent is hindered, so that the reliquefaction hardly proceeds. Even with such a reliquefying agent, effective reliquefaction is possible by dispersing the reliquefying agent into the gel structure in a state where it shows no reliquefying function, and then by adding a reliquefaction inducing agent so as to act on the reliquefying agent, to show its reliquefying function.

Also, the reliquefying reaction rate can be raised in many cases by dispersing the reliquefying agent in advance in the gel structure. This is particularly effective when the reliquefying agent is (a) a material which has a low penetrability into the network structure of the gel (a less penetrable material) or (b) a material which forms a skin layer by a reaction with the gel (a skin-layer forming material).

The less penetrable material (a) generally indicates a material which does not penetrate into the network structure of the gel. For example, a high-molecular compound has difficulties in penetration into the gel and the penetration of the compound into the network structure of the gel is inhibited. In the meantime, there is a material having high reactivity with the gelling agent even if the material is less penetrable, and it is therefore possible to complete the reaction to the end if plenty of time is allowed. In such a material, the factors determining the reactivity and penetrability are considered to be different from each other. For example, it is considered that the length of the primary chain has an influence on the penetrability while the structure of the side chain has an influence on the reactivity. If this influence is viewed from the viscosity of the gel, it can be said that much reaction time is taken when the viscosity of the gel is higher.

Even with materials and conditions disadvantageous in the reliquefaction as shown above, if the reliquefaction partly proceeds, causing the gel to have fluidity, the reaction rapidly proceeds afterward. Specifically, if once the viscosity starts dropping, the viscosity of the whole gel drops rapidly. It is found from this fact that the factor inhibiting the reaction is attributed to the initial stage of the reaction. Therefore, if the reliquefying agent is dispersed in advance, this phenomenon can be improved. It is considered that such a behavior is caused because the increase in the fluidity of the gel makes it easy to bring the whole network structure of the gel into contact with the reliquefying agent.

It is therefore considered that, by dispersing the reliquefying agent in advance in the gel, it is possible to efficiently use a less penetrable material, with improving the reaction rate.

As the material (b) which forms a skin layer upon contact with the gel, peptide and the like can be mentioned. Also, there are materials that cause ionization in methanol, but such materials usually react with the gelling agent regardless of the presence or absence of the reliquefaction inducing agent, and thus such a material cannot be used as it is in combination with the reliquefaction inducing agent.

However, such a material can be utilized if it is used in combination with other reliquefying agent. For example, if an organic acid (for example, vitamin C) is used as the "other" reliquefying agent and this organic acid is dispersed in advance in the gelling agent, the reliquefying agent that tends to form a skin layer can be utilized.

Specifically, the system may have the structure in which one of the reliquefying agents starts to reliquefy by an addition of the reliquefaction inducing agent, the viscosity of the gel drops, and then the functions of the highly reactive material are developed, to proceed with a reliquefying reaction without any formation of a skin layer.

Moreover, as the reliquefying agent, one having an index function given by, for example, colors is also preferably used. For example, vitamin C shows a white color in a methanol gel because its oxidation is suppressed, but it is oxidized to take on a yellow color in an aqueous solution. Utilizing this nature, vitamin C may be used as an index of reliquefaction (an unsealing index); a reliquefaction inducing agent (for example, water) is added to the white vitamin C contained in the gel of the fuel (for example, methanol), to reliquefy the fuel, and the color of the white vitamin C is changed to a yellow color.

The method of dispersing the reliquefying agent in the gel structure is not particularly limited, and examples include (a) in the case of arabic-glue-form gelled product, a method of mixing the gelling agent and the fuel, to form the gel structure, and then dispersing the reliquefying agent therein by stirring; (b) in the case of using a crosslinking type gel, a method of mixing the reliquefying agent with the gel before the gelling agent is crosslinked (before polymerized); (c) in the case of using a fibrous gel, a method of, after forming the fibrous gel, dispersing the reliquefying agent by embedding (hot press) it with heating; (d) in the case of using a double network gel, a method of coating the periphery of the gel containing the reliquefying agent with another gel; and (e) a method of dispersing and preserving the gelling agent at a desired position of the gel structure with a desired distribution by molecular imprint.

Also, when the reliquefying agent is insoluble in the fuel, it is preferably dispersed in the gelling agent. By this measure, close contact between the network structure of the gelling agent and the reliquefying agent are realized and the rate of reliquefying reaction can be thereby improved.

When the reliquefying agent is soluble in the fuel, on the other hand, it is preferably added by dissolving it in water or an organic solvent. Alternatively, the reliquefying agent is preferably dispersed after it is coated with a material insoluble in the fuel. For the coating, microcapsule technologies are preferably used.

In the fuel mixture for fuel cells according to the present invention, in the case of dispersing the reliquefying agent in advance (II), the amount of the reliquefying agent to be added (in the case of plural reliquefying agents, the total amount of these agents) is preferably an amount enough to reliquefy the gelled product, though no particular limitation is imposed on the amount. For this, the amount may be decided in relation to the amount of the fuel and the amount of the gelling agent that interacts with the reliquefying agent, and, depending on the case, the amount of the reliquefaction inducing agent. When expressed based on 100 parts by mass of the fuel, the amount of the reliquefying agent is preferably 1 to 30 parts by mass and more preferably 1 to 10 parts by mass. The amount of the reliquefying agent to be added is preferably small so as not to lower the content of the fuel; however, if the amount of the reliquefying agent is too small, it is difficult to ensure the reactivity of reliquefaction. It is therefore preferable to determine the amount of the reliquefying agent in consideration of the content of the fuel and the reactivity of reliquefaction.

In the fuel mixture for fuel cells according to the present invention, any material may be used as the reliquefaction inducing agent without any particular limitation insofar as it can promote reliquefaction. As the reliquefaction inducing agent, water or an aqueous medium is preferable. When the reliquefaction inducing agent is an aqueous medium, pH regulators having a low-molecular weight (for example, a molecular weight of 100 to 1,000) (for example, an amino acid solution, a peptide solution, an acidic material or alkali material analogous to the fuel cell electrolyte; for example, sulfuric acid or the like, for a perfluorosulfone film separator or the like) and an organic acid solution (for example, a stearic acid solution and an ascorbic acid solution) are preferable, and ascorbic acid is more preferable because it can function as a fuel, depending on the type of fuel cell.

The amount of the reliquefaction inducing agent to be added is preferably an amount enough to reliquefy the gelled product though there is no particular limitation to the amount. For this, the amount of the reliquefaction inducing agent may be decided in relation to the amount of the fuel, the amount of the gelling agent, and in relation to the reliquefying agent to be promoted by a reliquefaction inducing action. When reliquefaction is promoted using a small amount of the reliquefaction inducing agent, the amount of the reliquefaction inducing agent is preferably 1 to 30 parts by mass and more preferably 1 to 10 parts by mass, based on 100 parts by mass of the fuel. The amount of the reliquefaction inducing agent to be added is preferably small so as not to lower the content of the fuel; however, if the amount of the reliquefaction inducing agent is too small, it is difficult to ensure the reactivity of reliquefaction inducing reaction. It is therefore preferable to determine the amount of the reliquefaction inducing agent in consideration of the content of the fuel and the reactivity of reliquefaction.

A method of adding the reliquefaction inducing agent may be determined according to the amount of the reliquefaction inducing agent to be added and the form of the fuel mixture. Examples of the method include a method in which a reliquefaction inducing agent soluble in a fuel is added to a gelled product obtained by dispersing a reliquefying agent insoluble in the fuel in advance; a method in which the reliquefaction inducing agent is added with a time lag, that is, after the addition of a reliquefaction inducing agent, the system is left until the reaction is finished, and thereafter a reliquefying agent is added; and a method in which a reliquefaction inducing agent insoluble in a fuel is dispersed in advance in a gelled product, and a reliquefying agent soluble in the fuel is added thereto.

Also, in the case where gas fuel is fluidified to use, for example, when a dispersed fluid fuel in which a hydrogen occlusion material or the like is dispersed is used, gelation or reliquefaction thereof may be conducted in the same manner as those mentioned above. Moreover, after reliquefaction, the gas fuel (for example, hydrogen) may be extracted from the occlusion material by hydrolysis, dehydration, or dehydrogenation reaction, and used for the generation of electricity. Takashi Salada, Takamasa Yanagase et al., "Kinzoku-suisokabutsu wo Mochiita Passive-ho Kogata-nenryo-denchi no Kaihatsu (Development of Passive System Small Fuel Cell Using Metal Hydride)", Seiko Instrument, 12th Fuel Cell Symposium Meeting Preprint; Yasuyuki Tsutsumi, Gan Ryu et al., "Dassuiso-hanno-gata Nenryo-denchi (Dehydrogenation Reaction Type Fuel. Cell)", 12th Fuel Cell Symposium Meeting Preprint; and the like may be used as references.

In the fuel mixture for fuel cells according to the present invention, the fuel mixture may be absorbed in a porous material when used. By taking such a measure, the surface area where the gelling agent is brought into contact with the reliquefying agent can be increased and the reliquefaction can be attained more easily. In this case, the part of the air incorporated into a part of the porous material or the inside of the porous material forms a dead space. However, if, for example, gelling agent monomers are polymerized in the condition that the fuel mixture is incorporated into the porous material, the contact area can be increased efficiently with decreasing the dead space.

As the porous material used in the fuel mixture according to the present invention, any form may be used without any particular limitation, insofar as it is suited for absorbing the fuel mixture. Examples of the porous material include a sponge-state porous material and nonwoven fabric-state porous material (for example, Lanseal F (trade name), manufactured by Toyobo Co., Ltd.). The dead space can be further reduced by a nonwoven fabric made of ultra-absorbing fiber. As mentioned above, the porous material used for the fuel mixture according to the present invention is not limited to those having micropores but may be those having the function of increasing the area of the reaction between the fuel mixture and the reliquefaction inducing agent or the reliquefying agent, and the pores include clearances between fibers.

Although the porous material may be disposed over the whole gelled fuel, it may be disposed with a certain distribution for the whole gelled fuel. For example, by disposing the porous material in the vicinity of an addition means used to add the reliquefying agent, liquefaction first proceeds in the vicinity of the porous material and then the gel is fluidized, to thereby promote the reaction at the positions apart from the porous material. Also, by disposing the porous material in the vicinity of an extracting means used to extract the reliquefied fuel, the porous material can be utilized as a filter material as well. When such a filter material is disposed, the effusion of impurities into the fuel cell may be reduced. Examples of the impurities to be adsorbed to or absorbed in the filter material include the gelling agent, reliquefying agent, and reaction products of these materials.

Although there is no particular limitation to the amount of the porous material insofar as it is enough to absorb, move and disperse the fuel mixture, the amount in terms of volume ratio is preferably 1 to 20% and more preferably 1 to 10%, based on the gelled fuel mixture.

With the fuel mixture for fuel cells according to the present invention, it is possible to withdraw the reliquefied fuel, by adding the reliquefying agent to the gelled fuel mixture or by dispersing the reliquefying agent in advance and then adding the reliquefaction inducing agent, to break the network structure formed in the gel structure, and thereby fluidizing the fuel. Such good reliquefaction is, though incompletely clarified, considered to be brought about by four types of actions, that is, (a) production of insoluble salts, (b) variation of pH, (c) entanglement of molecules, and (d) combination of these factors. Each of these actions will be explained hereinbelow. However, the present invention should not be interpreted as restrictive to these.

(a) Production of Insoluble Salts

It is considered that in the gel structure, a salt is formed from the gelling agent and the reliquefying agent. It is therefore considered that a salt insoluble in the fuel can be obtained by appropriately combining the fuel, the gelling agent, and the reliquefying agent, and use of such a salt can further promote the progress of reliquefaction.

(b) Variation in pH

A high-molecular electrolyte generally changes its ionization degree depending on pH. When a high-molecular electrolyte is used as the gelling agent, it is considered that the progress of reliquefaction can be further promoted by adjusting the pH of the solution.

(c) Entanglement of Molecules

When both the gelling agent and the reliquefying agent are polymers, it is considered that the progress of reliquefaction can be further promoted by allowing both to be entangled. This effect is considered to be more heightened in the case where a side chain of the gelling agent and a side chain of the reliquefying agent are electrically attracted to each other.

(d) Combination of These Factors

It is considered that the progress of reliquefaction can be synergetically promoted, and therefore, the effect can be heightened, by properly combining the above actions.

When the reliquefying agent is added to the gelled fuel mixture or when the reliquefying agent is dispersed in advance in the gelled fuel mixture and the reliquefaction inducing agent is then added, the reliquefying agent and the gelling agent interact on each other, and cause a large drop of the viscosity, causing reliquefaction of the fuel. At this time, it is preferable to regulate conditions depending on the type of reliquefying agent such that the viscosity of the refluidized fuel is less than 0.02 Pa·sec. If the viscosity of the refluidized fuel is too high, the fuel cannot be extracted efficiently.

In addition to the above components, perfumes, dyes, corrosion preventive, identification agent, combustion improver, surfactant, and the like may be added to the fuel mixture for fuel cells according to the present invention, to the extent that the properties of the fuel mixture are not adversely affected.

As the perfumes, isoamyl formate, ethyl vanillin, citral, isoamyl propionate, 1-menthol, trans-2-butene, cis-2-butene, and the like may be used. However, mercaptans and sulfides, which are general perfumes, contain sulfur and are therefore undesirable because these perfumes not only are a cause of environmental pollution but also have, for example, a problem that they deteriorate the catalyst used in the fuel cell. The dye may be any of organic pigments, inorganic pigments, and dyes, and may be formulated with a fluorescent dye. As the corrosion preventive, dimer acid, polyoxyethylenealkylamine, carboxybetaine type amphoteric surfactant and the like may be used. The combustion improver is preferably one having high vapor pressure (for example, vapor pressure higher than the fuel) and more preferably one capable of generating electricity using the same mechanism and catalyst as the fuel. As the combustion improver, for example, an organic acid, vitamin C, sodium borohydride, and formic acid may be used. As the surfactant and identification agent, materials described in JP-A-2001-93558 ("JP-A" means unexamined published Japanese patent application) may be utilized.

Next, structural examples of the fuel cell will be given to explain preferred embodiments of the present invention. However, these examples are not intended to be limiting of the present invention.

Figure 3:
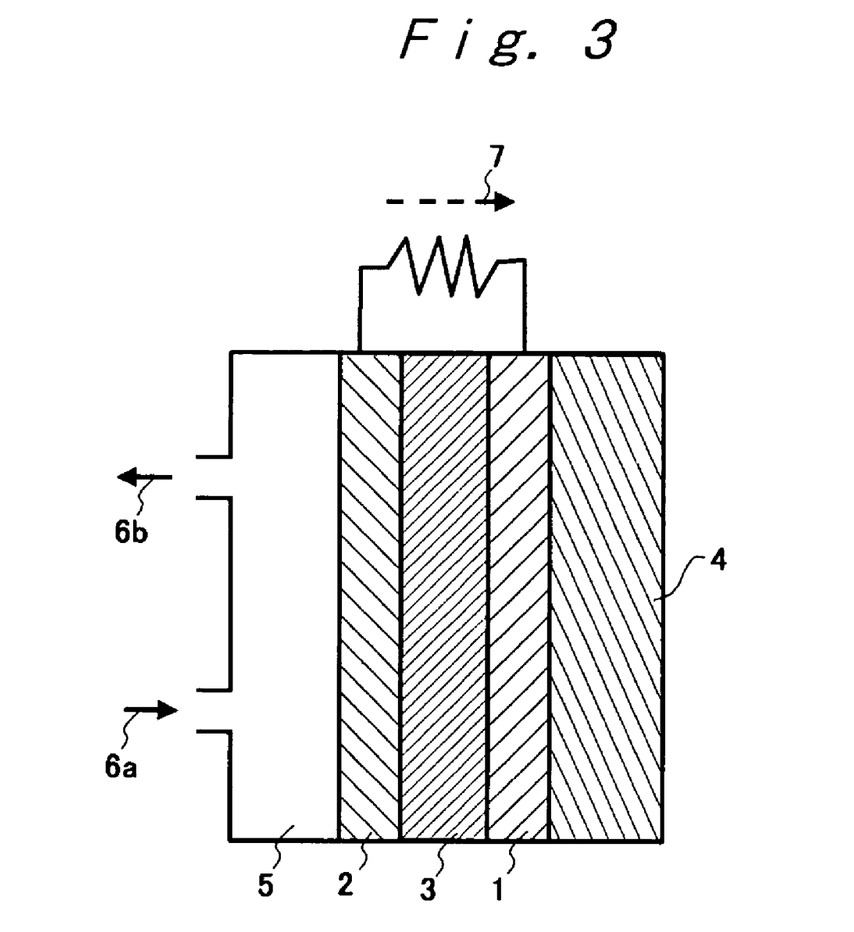
FIG. 3 is a sectional view schematically showing an example of the structure of a general fuel cell.

FIG. 3 is a sectional view schematically showing a structural example of a general fuel cell. In FIG. 3, a fuel electrode 1 and an oxidant electrode 2 are disposed on both sides of a separator 3, and a fuel chamber 4 and an oxidant chamber 5 are disposed on the outsides of these electrodes respectively. Then, fuel (for example, hydrogen or methanol) is oxidized by an oxidant (for example, oxygen) made to pass through (arrows 6a and 6b) the oxidant chamber 5 and also the oxidant is reduced to generate electricity directly, with the result that current flows (arrow 7). As the separator 3, a material which contains an electrolyte, well transmits ions (for example, hydrogen ions) and does not transmit reaction materials (for example, hydrogen, methanol, and oxygen) is preferably used.

The fuel mixture for fuel cells according to the present invention may be used in the above-mentioned fuel cell having a common structure. For example, the fuel mixture may be put into the fuel chamber 4 and the reliquefying agent or the reliquefaction inducing agent may be added from a supply port (not shown), to reliquefy the fuel, which is then used. At this time, there is a possibility that the liquefied fuel and the separated solid components (for example, the gelling agent and reliquefying agent) enter the fuel cell, unlike a fuel cell using a filter, which will be described later. However, usually, the contact between the liquefied fuel and the electrode is sufficiently ensured and the generation of electricity can be well attained.

Figure 1:
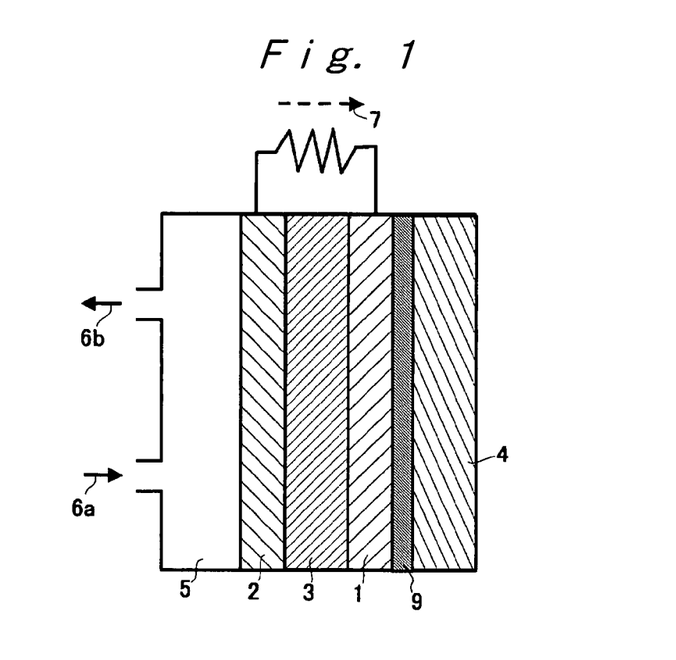
FIG. 1 is a sectional view schematically showing a preferable example of the structure of a fuel cell which uses a fuel mixture according to the present invention.

FIG. 1 is a sectional view schematically showing a preferable structural example of a fuel cell which uses the fuel mixture for fuel cells according to the present invention. In this fuel cell, a filter material 9 is provided on the outside of the fuel electrode 1, to prevent materials (for example, the gelling agent, the reliquefying agent, and other additives) other than the fuel contained in the fuel mixture from being in contact with the fuel electrode 1. In a fuel cartridge for fuel cells according to the present invention, the cartridge may be designed so that it has the filter material 9 and the fuel chamber 4 in which the fuel mixture is placed, and the cartridge may be designed to be removable from the structural body of the fuel cell, so as to make it to an exchangeable cartridge. In the fuel cartridge for fuel cells according to the present invention, a filter material is preferably used in the same manner as in the above structure. The provision of the filter material ensures that the fluid fuel can be selectively poured into the battery body, to prevent the output of the battery body from deteriorating.

Figure 2:
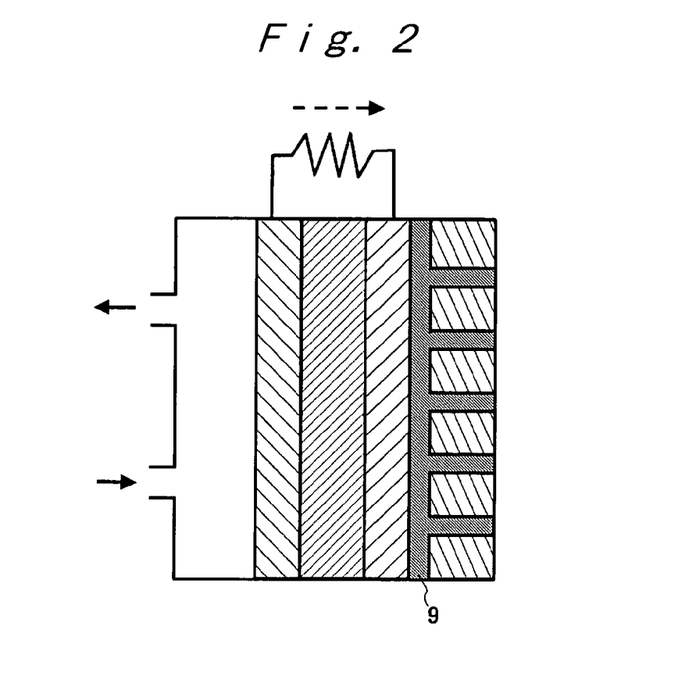
FIG. 2 is a sectional view schematically showing another preferable example of the structure of a fuel cell which uses a fuel mixture according to the present invention.

FIG. 2 is a sectional view schematically showing another preferable structural example of a fuel cell which uses the fuel mixture for fuel cells according to the present invention. In this fuel cell, a fuel cell having the same structure as shown in FIG. 1 is used and further, the fuel mixture for fuel cells in the fuel chamber are separately preserved in at least two or more partitions (cells) obtained by dividing the fuel chamber by the filter material, thereby forming a multi cell structure; and the reliquefying agent or the reliquefaction inducing agent is poured into individual cells according to the need, which allows gradual generation of electricity.

Although no particular limitation is imposed on the material for the filter material, the filter material has particularly preferably a molecular weight cut-off of 10,000 or more. When the molecular weight cut-off of the filter material exceeds 10,000 or more, the filter material is not clogged, ensuring high generating efficiency of the fuel cell.

In addition to the aforementioned structures, examples of embodiments in which the fuel is gelled for preservation and then the gelled fuel is refluidized by the reliquefying agent, include (i) an embodiment in which the gelling agent and the reliquefying agent are stored in separate containers before the fuel cell is used, and then mixed with each other when generating electricity, (ii) an embodiment in which the gelling agent and the reliquefying agent are poured into separate partitions respectively in one container, and (iii) an embodiment in which the gelling agent and the reliquefying agent encapsulated in a microcapsule in advance are filled in the same container, wherein the microcapsule is burst along with a variation in volume resulting from the consumption of the fuel when generating electricity and as a result, the reliquefying agent in the capsule flows out. Examples of the material of the microcapsule include a polyvinyl alcohol (PVA) crosslinked film, nylon film, styrene/divinylbenzene copolymer film, gelatin/gum arabic film, and silica (TEOS) polymer film. It is preferable to form an adhesive layer that adheres to the gelled fluid fuel, on the periphery of the microcapsule including the reliquefying agent.

EXAMPLES

The present invention will be described in more detail based on examples given below, but the invention is not meant to be limited by these. The following instruments were used to measure physical properties.
(Viscosity)

The measurement was carried out with a viscometer (trade name: Digital Viscomate VM-100 (PR-100-L), manufactured by Yamaichi Electric Co., Ltd.), according to a high-frequency oscillating method.
(Measurement of Current)

With a multimeter (trade name: ADVANTEST Digital Multimetar TR6845), a current-voltage curve was measured by using a variable resistance and also, gross generation (instantaneous electromotive force (mW) at the time of measurement) and integrating watt were measured by using a fixed resistance. (Confirmation of the operation of the fuel cell)

The fuel mixture was incorporated into Hydor-Genius Science Kit manufactured by Heliocentris, to confirm whether it functioned as a fuel cell. At this time, as the separator, one obtained by making Nafion 115 (trade name, manufactured by Du Pont) carry 2 mg/cm$^2$ of a platinum catalyst was used.

Example 1

4 ml of methanol having a viscosity of 0.00059 Pa·sec and 0.2 g of a polyacrylic acid (manufactured by Wako Pure Chemical Industries Ltd., average molecular weight: 1,000,000) were mixed, to prepare a gelled fuel mixture. Methanol was gelled by the polyacrylic acid, and thus safety was ensured.

The obtained gelled fuel mixture was put in the fuel chamber of a fuel cell (filter material: 0.45 μm cellulose acetate membrane filter) having the structure shown in FIG. 1. 0.058 g of a peptide (manufactured by Wako Pure Chemical Industries Ltd., average molecular weight: 2,000) was added to the gelled fuel mixture, to reliquefy the fuel mixture. At this time, the operation of the fuel cell was confirmed and the gross generation of electricity was measured, to find that the generating efficiency was 70% or more (hereinafter, the term "generating efficiency" means a value (%) obtained by dividing "the gross generation obtained using the reliquefied fuel" by "the gross generation obtained using only the same amount of methanol".)

Example 2

A gelled fuel mixture was obtained in the same manner as in Example 1, except that 0.03 g of a polyacrylic acid crosslinked body (trade name: (Model No. Highviswako103, manufactured by Wako Junsei Kagaku) was used in place of the polyacrylic acid. Methanol was gelled by the polyacrylic acid crosslinked body, and thus safety was ensured.

Then, the fuel was reliquefied in the same manner as in Example 1, and the operation of the fuel cell was confirmed and the gross generation of electricity was measured, to find that the generating efficiency was 75% or more.

Example 3

Using a fuel cell in which the fuel chamber of a fluid fuel cartridge was divided as shown in FIG. 2 by using a filter material, which had the molecular weight cut-off of 1,000 (trade name: PBTK0431 (NMWL30K), manufactured by MILLIPORE), the fuel mixture prepared in Example 1 was put in each divided fuel chamber. Methanol was gelled by the polyacrylic acid, and thus safety was ensured.

Then, the fuel was reliquefied in the same manner as in Example 1, and the operation of the fuel cell was confirmed and the gross generation of electricity was measured, to find that the generating efficiency was 50% or more.

Comparative Example 1

4 ml of methanol having a viscosity of 0.00059 Pa·sec and 0.2 g of a polyacrylic acid (manufactured by Wako Pure Chemical Industries Ltd., average molecular weight: 1,000,000) were mixed, to prepare a gelled fuel mixture. The obtained gelled fuel mixture was put in the fuel chamber of a fuel cell (filter material: 0.45 μm cellulose acetate membrane filter) having the structure shown in FIG. 1, and the operation of the fuel cell was confirmed and the gross generation of electricity was measured, to find that the generating efficiency was 30%. It is understood from this result that a lot of fuel that cannot be extracted exists in the inside of the gel. Also, the generating efficiency in the situation where no pressure was applied was 25%, and the rate of penetration of the fuel into the filter material in this case was slower than in the case where the fuel was reliquefied.

Example 4

8 ml of methanol was mixed in 300 mg of a polyacrylic acid (manufactured by Wako Pure Chemical Industries Ltd., average molecular weight: 1,000,000), and the mixture was allowed to stand stationarily at 29° C. overnight, to produce a gelled fuel mixture having a viscosity of 0.303 Pa·sec. Methanol was gelled by the polyacrylic acid, and thus safety was ensured.

The obtained gelled fuel mixture was put in the fuel chamber of a fuel cell (filter material: 0.45 μm cellulose acetate membrane filter) having the structure shown in FIG. 1. A solution in a hot-water bath obtained by dissolving 300 mg of a gelatin (Gelatin Leaf, manufactured by MARUHA Corporation) in 1 ml of water heated to 80° C. was added to the gelled fuel mixture, which was then stirred. The fuel mixture was separated into a liquid part and a precipitation part, and the liquid part was cloudy and white. The viscosity of the liquid part two minutes after the addition of the solution in a hot-water bath was 0.025 Pa·sec. At this time, the operation of the fuel cell was confirmed and the gross generation of the fuel cell was measured, to find that the generating efficiency was 65% or more.

Example 5

1000 mg of a powdery vitamin C (manufactured by IWAKI SEIYAKU CO., LTD., raw powder of ascorbic acid) was mixed with 300 mg of a polyacrylic acid (manufactured by Wako Pure Chemical Industries Ltd., average molecular weight: 1,000,000) under stirring to disperse. 8 ml of methanol was mixed in the above mixture, which was allowed to stand stationarily at 29° C. overnight, to produce a gelled fuel mixture having a viscosity of 0.303 Pa·sec. Methanol was gelled by the polyacrylic acid, and thus safety was ensured.

The obtained gelled fuel mixture was put in the fuel chamber of a fuel cell (filter material: filter paper) having the structure shown in FIG. 1. 1 ml of water was added to the fuel mixture. The fuel mixture was fluidized with retaining a viscosity. The viscosity of the fuel mixture one hour after the addition of water was 0.058 Pa·sec. At this time, the operation of the fuel cell was confirmed and the gross generation of the fuel cell was measured, to find that the generating efficiency was 40% or more.

Example 6

A gelled fuel mixture was produced in the same manner as in Example 5, except that 300 mg of powdery sodium bicarbonate (manufactured by Wako Pure Chemical Industries Ltd., purity: 99.5%) was used in place of ascorbic acid. Methanol was gelled by the polyacrylic acid, and thus safety was ensured.

The obtained gelled fuel mixture was put in the fuel chamber of a fuel cell (filter material: 0.45 μm cellulose acetate membrane filter) having the structure shown in FIG. 1. 1 ml of water was added to the gelled fuel mixture. The fuel mixture was separated into a liquid part and a precipitation part, and the liquid part was cloudy and white. The viscosity of the liquid part 10 minutes after the addition of water was 0.008 Pa·sec. At this time, the operation of the fuel cell was confirmed and the gross generation of the fuel cell was measured, to find that the generating efficiency was 80% or more. However, a reduction in the output of the fuel cell was observed after the fuel cell was operated for a long period of time.

Example 7

A gelled fuel mixture was produced in the same manner as in Example 5, except that 300 mg of a powdery peptide (manufactured by Wako Pure Chemical Industries Ltd., collagen peptide enzymatically degraded product, average molecular weight: 2,000) was used in place of ascorbic acid. Methanol was gelled by the polyacrylic acid, and thus safety was ensured.

The obtained gelled fuel mixture was put in the fuel chamber of a fuel cell (filter material: 0.45 μm cellulose acetate membrane filter) having the structure shown in FIG. 1. 1 ml of water was added to the gelled fuel mixture. A transparent liquid part was separated from the fuel mixture. The operation of the fuel cell was confirmed and the gross generation of the fuel cell was measured five minutes after the addition of water, to find that the generating efficiency was 70% or more.

Example 8

A 20 mm×20 mm sponge-state porous material was put into the gelled fuel mixture prepared in Example 5. The obtained porous material including the fuel mixture was placed in the fuel chamber of a fuel cell (filter material: 0.45 μm cellulose acetate membrane filter) having the structure shown in FIG. 1. 1 ml of water was added to the gelled fuel mixture. By the addition, the fluidity of the fuel mixture in the porous material was increased and the fuel mixture was absorbed in the sponge-state porous material. When pressure was applied to the sponge-state porous material, the fuel was emitted. Using the fuel emitted 5 minutes after the addition of water, the operation of the fuel cell was confirmed and the gross generation of the fuel cell was measured, to find that the generating efficiency was 40% or more.

INDUSTRIAL APPLICABILITY

The fuel mixture for fuel cells of the present invention may be preferably used in, for example, portable power sources, power sources for vehicles, and domestic power source systems. Also, the fuel reliquefying system for fuel cells, fuel cartridge for fuel cells, and method of extracting fuel for a fuel cell, of the present invention may be preferably used as means enabling fuel cell structures to be simplified, small-sized, and light-weighted.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2005-18092 filed in Japan on Jan. 26, 2005, and Patent Application No. 2005-236990 filed in Japan on Aug. 17, 2005, each of which is entirely herein incorporated by reference.

The invention claimed is:

1. A fuel mixture for fuel cells made of a gelled product, comprising at least a fuel and a gelling agent, and further comprising a reliquefying agent dispersed therein, wherein a reliquefaction inducing agent acts on the gelled product to reliquefy the fuel,
    wherein the reliquefying agent is an electrolyte having a molecular weight of from 1,000 to 8,000,000, ascorbic acid, stearic acid, peptide, sodium bicarbonate, a solid or liquid organic acid, or a solid or liquid organic acid salt,
    wherein the gelling agent is a compound selected from the group consisting of polyacrylic acid, polyacrylamide, polyethylene glycol, crosslinking polyacrylic acid, and crosslinking polyacrylamide, or a compound derived from these compounds,
    wherein the fuel comprises methanol, ethanol, dimethyl ether, formic acid, formalin, hydrazine or sodium borohydride, and
    wherein the reliquefaction inducing agent is selected from the group consisting of water, an amino acid solution, a peptide solution, a sulfuric acid solution and an organic acid solution.

2. The fuel mixture for fuel cells according to claim 1, wherein the gelling agent incorporates the fuel into its network structure, with the reliquefying agent dispersed therein, so as to form a gel structure of the gelled product, and wherein the reliquefying agent breaks the network structure of the gelling agent by virtue of the reliquefaction inducing agent acting on the gel structure to reliquefy the fuel.

3. The fuel mixture for fuel cells according to claim 1, wherein the gelling agent incorporates the fuel into its network structure forming a gel structure of the gelled product, with the reliquefying agent made of an electrolyte dispersed in a substantially unionized state, and wherein the electrolyte ionized by virtue of the reliquefaction inducing agent acting on the gel structure breaks the network structure of the gelling agent to reliquefy the fuel.

4. The fuel mixture for fuel cells according to claim 1, wherein the reliquefying agent is formed in a fine particle shape using polymer beads.

5. The fuel mixture for fuel cells according to claim 1, wherein the reliquefying agent is an electrolyte having a nonionic group or a cationic group or both on a side chain.

6. The fuel mixture for fuel cells according to claim 1, wherein the reliquefaction agent is an electrolyte salt containing a metal ion group.

7. The fuel mixture for fuel cells according to claim 2, wherein the gel structure is an electrolyte gel.

8. The fuel mixture for fuel cells according to claim 2, wherein the gel structure is crosslinked.

9. The fuel mixture for fuel cells according to claim 2, wherein the gel structure has a nesting structure or a double network structure of a plurality of said gelling agents.

10. The fuel mixture for fuel cells according to claim 1, further comprising a surfactant.

11. The fuel mixture for fuel cells according to claim 1, further comprising an antifreezing agent.

12. A fuel reliquefying system for fuel cells, comprising: at least a fuel, a gelling agent, a reliquefying agent, and a reliquefaction inducing agent, in which the fuel is reliquefied by adding the reliquefaction inducing agent to the gelled fuel mixture as claimed in claim 1.

13. The fuel reliquefying system for fuel cells according to claim 12, further comprising a porous material which can absorb the fuel mixture and cause an increase in a surface area where the gelling agent is brought into contact with the reliquefying agent.

14. A fuel cartridge for fuel cells, which uses the fuel reliquefying system as claimed in claim 12.

15. A method of extracting a fuel for fuel cells, comprising:
    forming a gel structure in which a fuel is incorporated into a network structure of a gelling agent, with a reliquefying agent dispersed therein,
    adding a reliquefaction inducing agent to the gel structure to make the reliquefying agent break the network structure of the gelling agent, and thereby
    reliquefying and extracting the fuel.

16. The method of extracting a fuel for fuel cells according to claim 15, wherein the gel structure is formed in which the fuel is incorporated into the network structure of the gelling agent, with the reliquefying agent made of an electrolyte dispersed in a substantially unionized state, and wherein the reliquefaction inducing agent is added to ionize the electrolyte and to make the ionized electrolyte break the network structure of the gelling agent, and thereby the fuel is reliquefied and extracted.

17. A fuel mixture for fuel cells, comprising: a fuel, a gelling agent, and a reliquefying agent;
    wherein the fuel and the gelling agent are mixed together to form a gelled product containing the reliquefying agent dispersed therein, and
    wherein the fuel in the gelled product is capable of being reliquefied and extracted upon addition of a reliquefaction inducing agent.

18. A fuel cartridge for a fuel cell, comprising: a gelled product and a reliquefying agent in a gel state, the gelled product containing at least a fuel and a gelling agent, wherein the fuel in the gelled product can be fluidized and extracted from the gelled product by an action of the reliquefying agent.

19. The fuel cartridge for a fuel cell according to claim 18, wherein the reliquefying agent is selected from the group consisting of an electrolyte having a molecular weight of from 1,000 to 8,000,000, proteins, peptides, collagens, gelatins, and agars.

20. The fuel cartridge for a fuel cell according to claim 18, wherein the gelling agent is a compound selected from the group consisting of polyacrylic acid, polyacrylamide, polyethylene glycol, crosslinking polyacrylic acid, and crosslinking polyacrylamide, or a compound derived from these compounds.

21. The fuel cartridge for a fuel cell according to claim 18, wherein the fuel comprises methanol, ethanol, dimethyl ether, formic acid, formalin, hydrazine, or sodium borohydride.

22. The fuel cartridge for a fuel cell according to claim 18, wherein the gelled product and the gelled reliquefying agent are separately preserved with a dividing wall comprising a plurality of holes.

\* \* \* \* \*